(12) United States Patent
Prakriya et al.

(10) Patent No.: US 11,114,899 B2
(45) Date of Patent: Sep. 7, 2021

(54) WIRELESS SYSTEM FOR IMPROVING PERFORMANCE AND PROLONGING BATTERY LIFETIME OF NODE BY ENERGY HARVESTING

(71) Applicant: INDIAN INSTITUTE OF TEHCNOLOGY DELHI, New Delhi (IN)

(72) Inventors: Shankar Prakriya, New Delhi (IN); Sudhakar Modem, New Delhi (IN)

(73) Assignee: Indian Institute of Technology Delhi, New Delhi (IN)

( * ) Notice: Subject to any disclaimer, the term of this patent is extended or adjusted under 35 U.S.C. 154(b) by 0 days.

(21) Appl. No.: 16/612,055

(22) PCT Filed: May 8, 2018

(86) PCT No.: PCT/IN2018/050284
§ 371 (c)(1),
(2) Date: Nov. 8, 2019

(87) PCT Pub. No.: WO2018/207206
PCT Pub. Date: Nov. 15, 2018

(65) Prior Publication Data
US 2020/0169122 A1    May 28, 2020

(30) Foreign Application Priority Data

May 8, 2017    (IN) .............................. 201711016203

(51) Int. Cl.
*H02J 50/27*    (2016.01)
*H02J 7/00*    (2006.01)
(Continued)

(52) U.S. Cl.
CPC ............. *H02J 50/27* (2016.02); *H01M 10/46* (2013.01); *H02J 7/0071* (2020.01); *H02J 7/345* (2013.01)

(58) Field of Classification Search
None
See application file for complete search history.

(56) References Cited

U.S. PATENT DOCUMENTS

| 7,692,411 B2 | 4/2010 | Trainor |
| 8,723,344 B1 * | 5/2014 | Dierickx ............... H02K 7/1846 290/1 R |

(Continued)

OTHER PUBLICATIONS

International Search Report dated Aug. 14, 2018 in reference to co-pending Indian Patent Application No. PCT/IN2018/05284 filed Aug. 5, 2018.

*Primary Examiner* — Jared Fureman
*Assistant Examiner* — Joel Barnett
(74) *Attorney, Agent, or Firm* — Dinsmore & Shohl LLP

(57) ABSTRACT

In wireless system, radio frequency (RF) energy harvesting addresses the problem of limited battery lifetime in wireless nodes. In this invention, a wireless system for improving performance and prolonging battery life time of node, a battery assisted relay (2) framework is introduced. In this battery assisted relay framework, the energy harvested (EH) relay (2) augments the harvested energy with energy drawn from the battery (10) so as to prolong the battery life. Thus the following optimizations become relevant (i) maximizing throughput performance by using fixed small amount of battery energy in every signaling interval, (ii) minimizing battery energy consumption with predefined throughput performance requirement by optimizing a fixed charging time and energy together (best statistically optimum fixed charging time and energy drawn are determined), (iii) minimizing battery energy consumption by allowing channel- (Continued)

Figure 1:
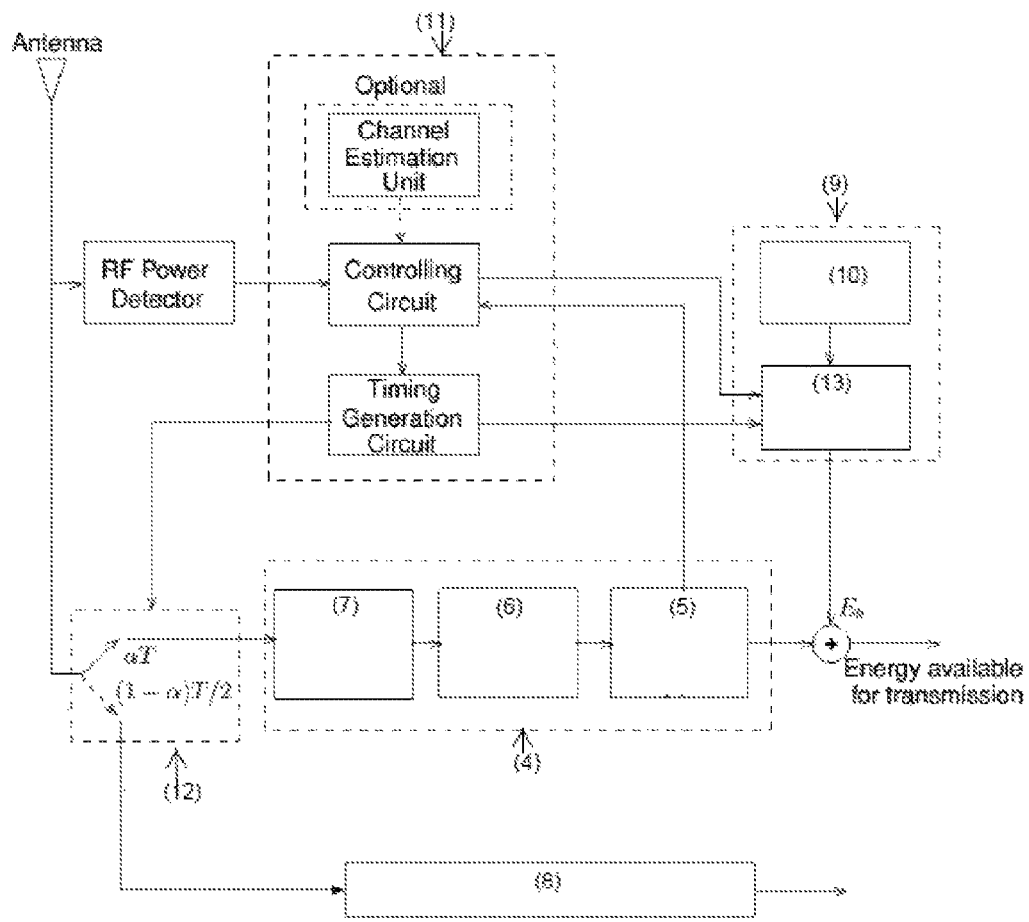

dependent energy harvesting duration, and (iv) minimizing battery energy consumption by drawing energy from the battery dependent on channel values. The suggested method and system can increase throughput as well as battery lifetimes, and are thus of practical value.

8 Claims, 6 Drawing Sheets

(51) Int. Cl.
*H01M 10/46* (2006.01)
*H02J 7/34* (2006.01)

(56) References Cited

U.S. PATENT DOCUMENTS

| | | | |
|---|---|---|---|
| 9,318,898 B2* | 4/2016 | John | A61N 1/3785 |
| 9,559,605 B2 | 1/2017 | Gudan | |
| 2012/0256492 A1 | 10/2012 | Song | |
| 2013/0124883 A1* | 5/2013 | Addepalli | H04W 52/0229 |
| | | | 713/310 |
| 2016/0048709 A1* | 2/2016 | Butler | H01Q 1/38 |
| | | | 340/10.51 |
| 2017/0310380 A1* | 10/2017 | Kim | H04L 5/14 |

* cited by examiner

WIRELESS SYSTEM FOR IMPROVING PERFORMANCE AND PROLONGING BATTERY LIFETIME OF NODE BY ENERGY HARVESTING

FIELD OF INVENTION

The present invention focuses on wireless systems in which energy is drawn from a multiple antenna source. Such nodes are equipped with energy harvesting circuitry in addition to a limited battery. They can thus supplement the harvested energy with as little battery energy as possible (to attain desired performance) so as to prolong battery lifetimes. The following optimizations become relevant (i) maximizing throughput performance by using fixed small amount of battery energy in every signaling interval, (ii) minimizing battery energy consumption with predefined throughput performance requirement by optimizing a fixed charging time and battery energy together (best statistically optimum fixed charging time and energy drawn are determined), and (iii) minimizing battery energy consumption by drawing energy from the battery dependent on channel values. The suggested method and system can increase throughput as well as battery lifetimes, and are thus of practical importance.

BACKGROUND OF THE INVENTION

Most of the wireless networks works depend on battery energy. Frequent replacement/recharging of battery incurs high cost, is inconvenient (e.g. in chemical environment) and sometimes undesirable (e.g. sensors in civil structures, sensors inserted in the human body). Internet of Things (IoT) devices are expected to have a very long battery life as per 5G specifications, and this is possible if energy harvesting is used to prolong battery life.

Energy harvesting from ambient sources shown to be improve the life-time of wireless networks. Radio frequency is shown to be convenient source of energy for energy harvesting compared to conventional natural sources (such as solar, vibrations, wind, etc.).

However, current wireless energy harvesting circuits require large energy harvesting time and have low efficiencies, which affect the quality-of-service (QoS) of the wireless networks. Energy harvesting from a source transmission is therefore preferred because of its reliability. The quantity of energy harvested is still often small, thereby resulting in poor QoS.

In US 2012/0256492, a radio frequency energy harvester harvests RF energy from the environment. The energy harvester may include a local power source. The energy harvester may have an associated crystal radio antenna that harvests AM radio waves ubiquitously. The radio frequency energy harvested may be stored via a Super capacitor. The stored energy may power a self-contained processing unit directly when the level of the energy harvested remains above a threshold level. However, if the energy harvested drops below the threshold level, the Data processing unit, which may include a radio, may switch to the local power source and/or a low power mode of operation. The low power mode of operation may reduce the amount of processing and/or transmitting by the radio. The processing unit may be part of a network of radios. The energy harvester may supply energy for a variety of applications, including building automation, industrial automation, power generation, and healthcare. Here the local power source is not necessarily a battery, and the energy from the battery is not combined intelligently and optimally with the harvested energy to prolong battery life. The patent US 2012/0256492 discusses rechargeable RF energy harvesting circuits only, and energy is not drawn from a battery in normal mode of operation. Instead, the node is put in a low power mode when harvested energy is small. This will limit reliability of design which is highly dependent on availability of harvested energy. In our patent, we proposed a reliable design based on harvested energy and energy drawn from a battery with the objective of maximizing battery lifetime and performance.

In U.S. Pat. No. 9,559,605 B2, a method and apparatus is disclosed herein for harvesting ambient energy. In one embodiment, an energy harvester comprises: a first RF rectifier to output a first voltage determined by rectified RF energy in response to received RF energy; a first energy reservoir coupled to the first RF rectifier to store energy at the first voltage; a DC/DC converter coupled to the first energy reservoir to convert the first voltage to a second Voltage; a second reservoir coupled to the DC/DC converter to store energy at the second Voltage, the second Voltage being greater than the first Voltage; and a third reservoir coupled to the second reservoir to receive energy transferred from the second reservoir periodically. The patent presents a RF energy harvesting circuit design for energy harvesting. Here, the node depends solely on availability of RF energy. In situations where RF energy available is low, very small amount of energy is harvested, and the node can no longer transmit. In present invention, we overcome this limitation by intelligently mixing harvested energy and energy drawn from a battery. This increases reliability of the link.

The invention suggests a system and method to use harvested wireless energy along with limited battery energy to increase the life-time of wireless network drastically while maintaining desired QoS.

OBJECTIVES OF THE INVENTION

The main objective of this invention is to facilitate optimal usage of limited battery energy along with harvested energy to improve the life-time of nodes in wireless networks. The invention optimizes the fraction of Time "T" apportioned for harvesting the energy, so that the harvested energy from the RF signal is optimally stored within the storage element like capacitor, which then along with battery energy improves the life-time of nodes in wireless network.

Another objective of the invention (in relayed communication) is to improve Quality-of-service to distant users by using nearby energy harvesting nodes as relays, while ensuring minimum relay battery energy consumption (so as to prolong its battery life).

SUMMARY OF THE INVENTION

The present disclosure a wireless system for improving performance and prolonging battery (10) lifetime of node by energy harvesting comprising: at least a source node (1) configured to provide RF signals; at least a destination node (3) configured to receive the RF signal transmitted from the source node (1); a relay (2) in communication with the source node (1) and the destination node (3), where the source node (1) is configured for communicating with the destination node (3) via the relay (2) for a Time "T", where the Time "T" has a first signaling phase, a second signaling phase and a third signaling phase, the relay comprising: an energy harvesting unit (4) comprising an energy storage element (5), configured for harvesting an energy from the source node (1) in the first signaling phase and storing the energy in the energy storage element (5); an information processing unit (8) configured for decoding the RF signal received from the source node (1) in the second signaling phase and transferring the decoded RF signal to the destination node (3); a battery energy control unit (9) having the battery (10), configured for controlling the amount of energy to be withdrawn from the battery (10); and a central controlling unit (11) in communication with the energy harvesting unit (4), battery control unit (9) and the information processing unit (10), configured for optimizing a fraction of Time "T" apportioned to the first signaling phase for optimizing harvested energy and for transferring the decoded RF signal from the information processing unit (8) to the destination node (2) in third signaling phase with the harvested energy augmented with energy withdrawn for the battery (10).

In an embodiment, the present disclosure provides that the battery energy control unit (9) extracts the energy from the battery (10) as specified by the central controlling unit (11).

In yet another embodiment, the present disclosure provides that the relay (2) uses a Time switching relay (TSR) protocol.

In still another embodiment, the present disclosure provides that the relay (2) comprises a switching circuit (12) for switching the relay from energy harvesting unit (4) to information processing unit (8), after harvesting the energy from the source.

In yet another embodiment, the present disclosure provides that the energy harvesting unit (4) comprises a matching circuit (7) and 3 stage voltage multiplier (6).

In yet another embodiment, the present disclosure provides that the central controlling unit (11) optimizes the fraction of Time "T" so that the harvested energy optimally stored within the Energy storage element (5).

In still another embodiment, the present disclosure provide a method for improving performance and prolonging battery (10) lifetime of node by energy harvesting in wireless system comprising;
Providing RF signal by a source node (1); Receiving the RF signal from the source node (1) by a destination node (3); Configuring a relay (2) in such a way so that the relay (2) communicates with the source node (1) and the destination node (3), and configuring the source node in such a way such that the source node (1) communicates with the destination node (3) via the relay (2) for a Time "T", where the Time "T" having a first signaling phase, a second signaling phase and a third signaling phase, and the relay (2) comprising: an energy harvesting unit (4), an information processing unit (8), a battery control unit (9) and a central controlling unit (11); Harvesting energy from the source node (1) RF signal and storing the harvested energy in a storage element (5) in first signaling phase by an energy harvesting unit (4); Decoding the RF signal from the source node (1) by an information processing unit (8) in second signaling phase; Controlling the amount of energy to be extracted from the battery (10) by a battery control unit (9); optimizing fraction of the time "T" apportioned to first signaling phase for optimizing harvested energy by a central controlling unit (11), the central controlling unit (11) in communication with the energy harvesting unit (4), information processing unit (8) and the battery control unit (9) for transferring the decoded RF signal to the destination node (2) by augmenting the harvested energy with the stored energy in third signaling phase.

BRIEF DESCRIPTION OF ACCOMPANYING DRAWINGS

FIG. 1: illustrates the block diagram of relay which shows usage of harvested energy and variable amount of battery energy $E_b$ with the central controlling unit.

Figure 2:
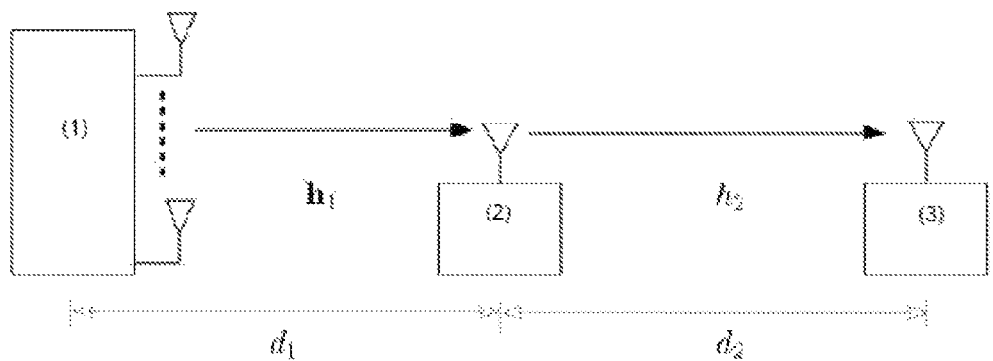

FIG. 2: illustrates two-hop system with battery-assisted energy harvesting relay.

Figure 3:
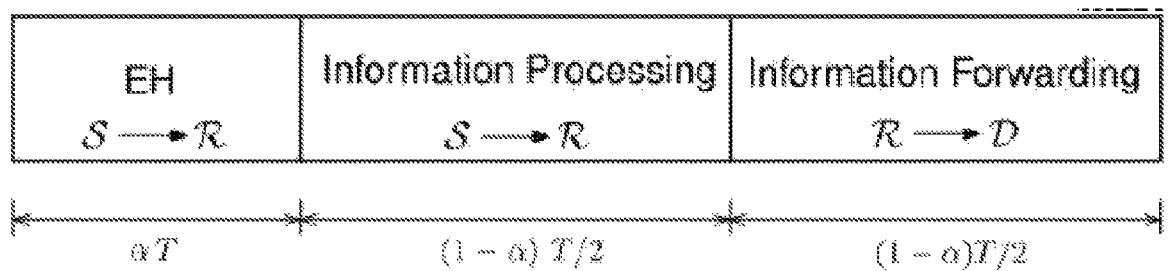

FIG. 3: illustrates the Time-switching relaying protocol of two-hop network.

Figure 4:
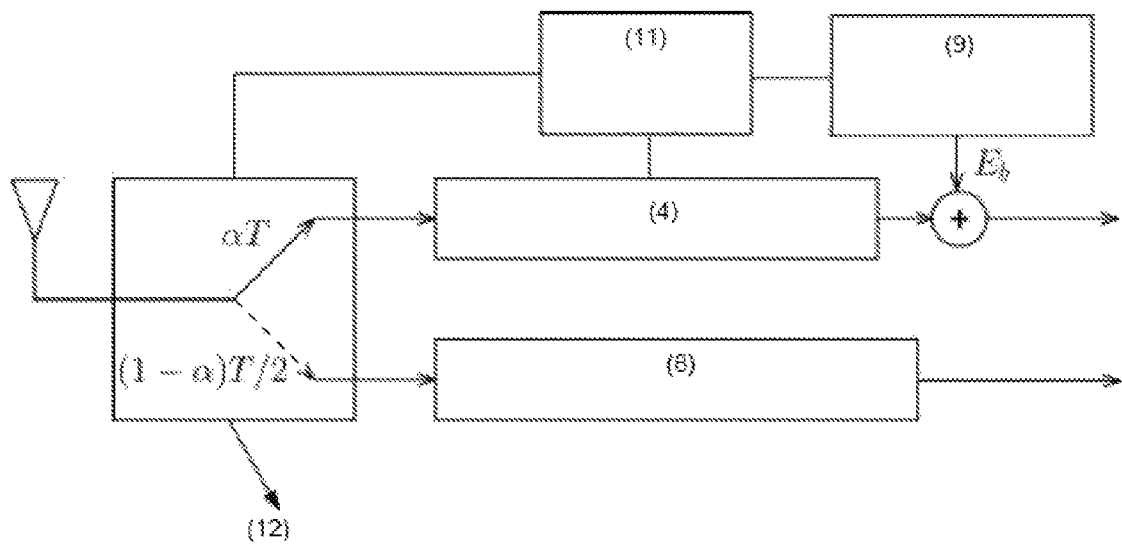

FIG. 4: illustrates the representation of time-switching relaying protocol implementation at relay.

Figure 5:
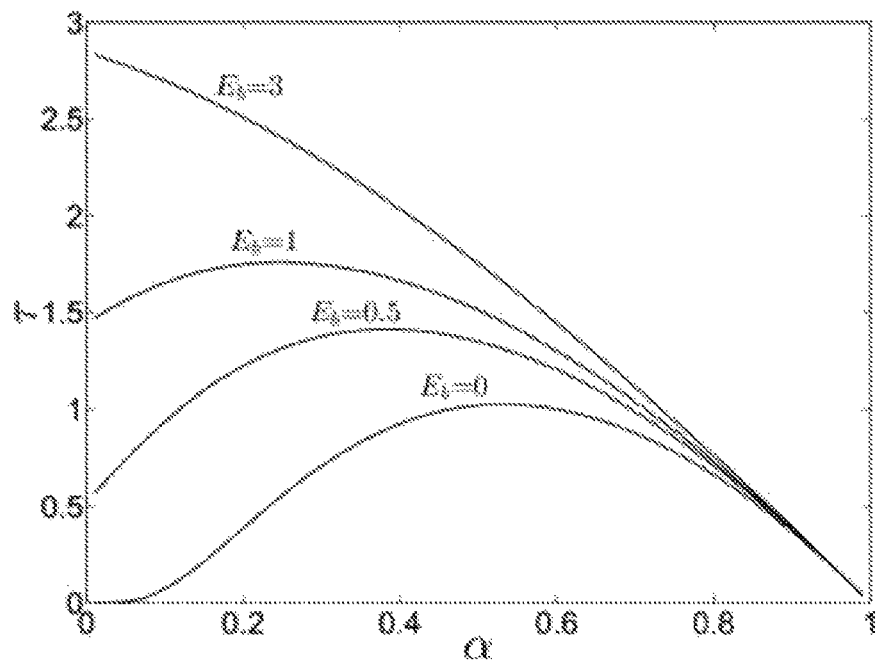

FIG. 5: illustrates the variation of throughput with TSR parameter. It shows there exist an optimum TSR parameter value which maximizes throughput.

Figure 6:
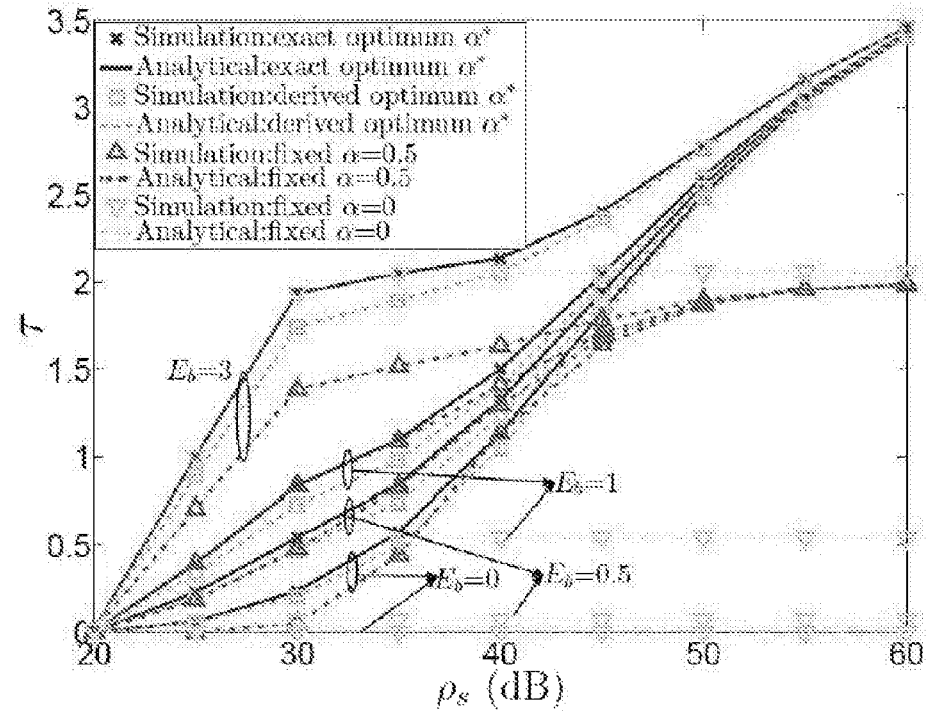

FIG. 6: illustrates the throughput variation with source signal-to-noise ratio (SNR). It shows that optimum TSR parameter improves throughput as compared to fixed TSR parameter value for fixed $E_b$.

Figure 7:
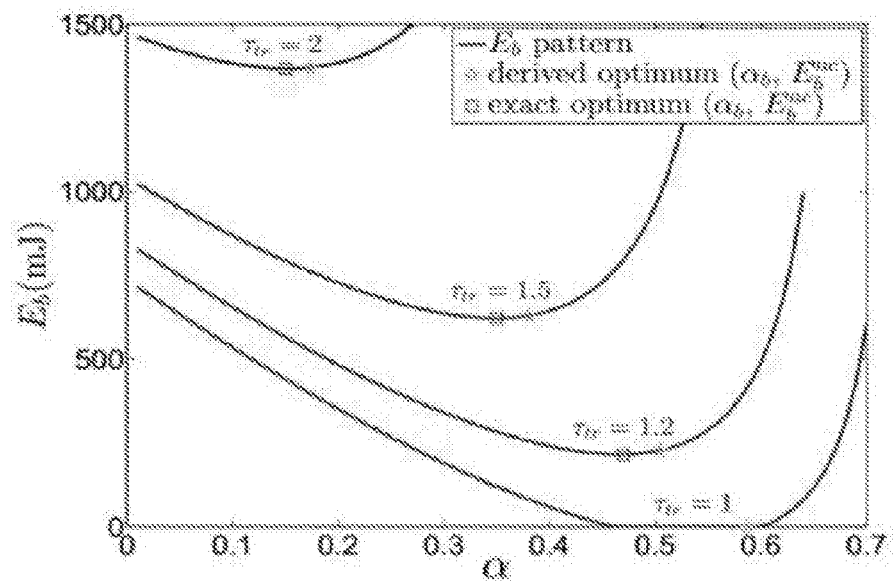

FIG. 7: illustrates the energy required for target throughput versus TSR parameter. It shows that there exist an optimum TSR parameter value which minimizes the required relay battery energy $E_b$ for target throughput requirement.

Figure 8:
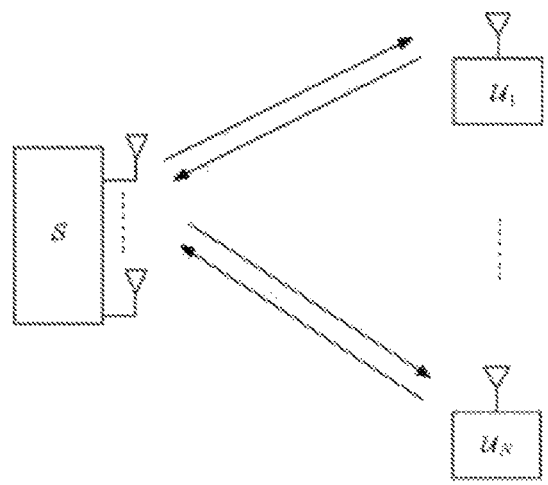

FIG. 8: illustrates the source-user sensor network with energy harvesting users.

Figure 9:
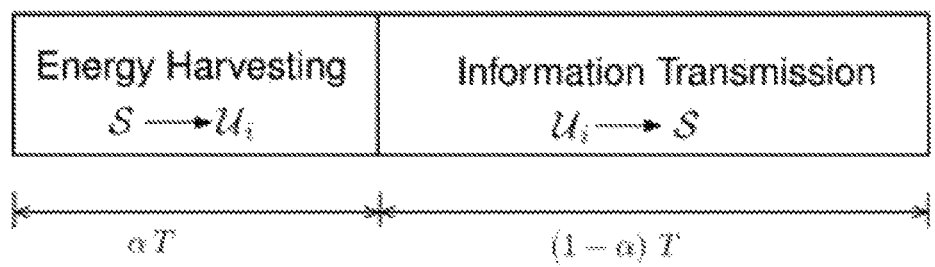

FIG. 9: illustrates the protocol of source downlink energy transfer, and user uplink information transfer with harvested energy and battery energy $E_b$.

Figure 10:
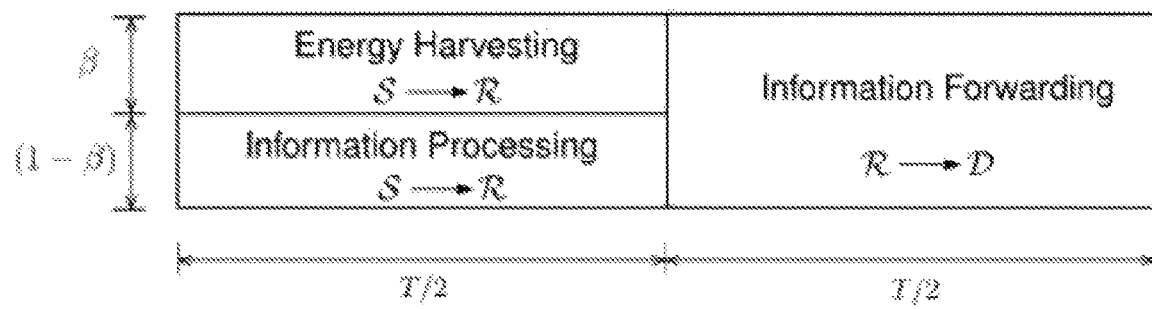

FIG. 10: illustrates the power-splitting relaying protocol of two-hop network.

Figure 11:
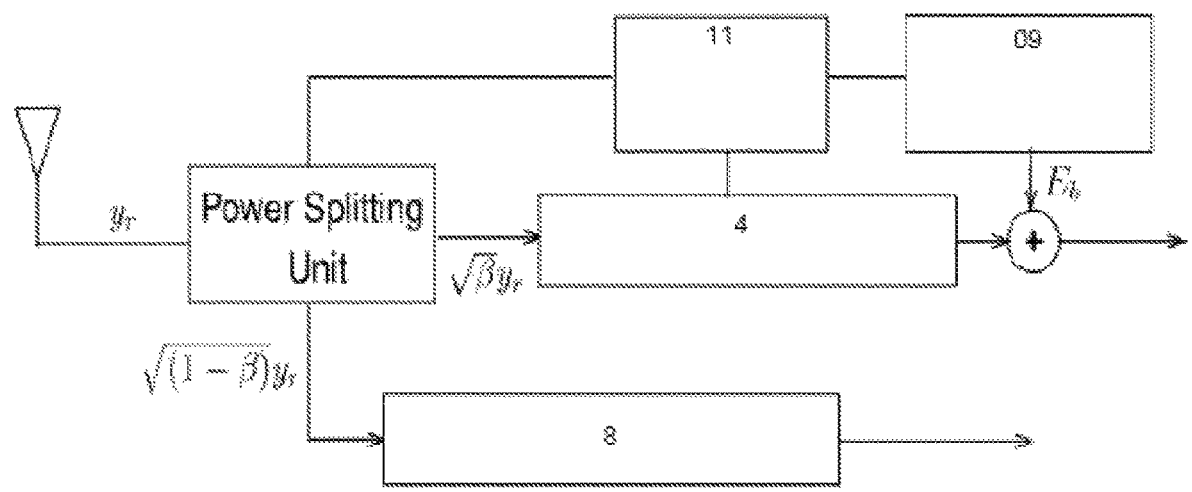

FIG. 11: illustrates the representation of power-splitting relaying protocol implementation at relay.

DETAILED DESCRIPTION OF INVENTION

Provided below is a non-limiting exemplary embodiment of the present invention with described reference of the accompanying drawings.

FIG. 1 illustrates the block diagram of the (Energy Harvesting) EH relay (2). The sensors have a wireless energy harvesting circuit, which is supplemented by a battery (10) from which variable amount of energy $E_b$ can be drawn as shown in FIG. 1. The amount of energy $E_b$ drawn from battery (10) is controlled through a central controlling unit (11). The energy storage element (5) like super capacitor of energy harvesting unit (4) is connected to battery (10) and central controlling unit (11), so that the augment battery energy extraction is controlled for desired performance. In a typical energy harvesting circuit, the fraction of time spent on energy harvesting (time-switching parameter), or fraction of signal energy diverted for energy harvesting (power-splitting parameter) determine the performance of a communication link with energy harvesting nodes. This invention shows how battery (10) energy and energy harvesting parameter can be controlled effectively to maximize throughput, or minimize battery energy consumption for given throughput requirement. As shown in FIG. 1, the relay (2) consists of four major units viz. (i) the central controlling unit (11), (ii) the energy harvesting unit (4), (iii) the battery energy controlling unit (9), and (iv) the information processing unit (8). The description mentioned here is specifically for time-switching, though similar hardware can be used for power-splitting type of energy harvesting circuits. The central controlling unit (11) performs the job of specifying the energy harvesting time through the parameter "α" and the energy "$E_b$" to be drawn from the battery (10). The signalling interval is denoted by T. The energy harvesting duration is αT. During this interval, the central controlling unit (11) provides timing waveforms that enables the circuit to switch between energy harvesting (4) and information processing (8). The central controlling unit (11) has information about average channel characteristics, harvested energy in the super capacitor (5), and optionally (when available) channel state information. This unit also indicates to the battery energy controlling circuit (9) the amount of energy $E_b$ to be drawn from the battery (10) in every signalling interval. The second unit is the energy harvesting unit (4) which harvests energy from the received RF signal from the antenna of source node (1) for αT time i.e. first signalling phase. The energy harvesting unit (4) consists of a matching circuit, a 3 stage voltage multiplier, and an energy storage element (5) like super capacitor. The harvested energy is temporarily stored in super-capacitor (5) and can be used for transmission in the next signalling phase. The battery energy controlling unit (9) extracts energy from battery as specified by the central controlling unit (11). The extracted battery energy is added to the harvested energy and the sum energy is used to transmit in the next signalling phase. The information processing unit (8) decodes the information using received signal from the antenna for (1-α)T/2 duration i.e. second signalling phase. Upon successful decoding, the relay (2) uses harvested energy from energy harvesting unit and battery energy from energy control unit for transmission of decoded message to destination in the next or third signalling phase. This invention relates to specifying the energy harvesting duration and the battery energy to be drawn. In this invention the central controlling unit (11) optimizes the fraction of Time "T" i.e first signalling phase so that optimum amount of energy can be harvested from the RF signal and optimally stored within the super capacitor (5) or energy storage element In this invention, in some situations, channel estimation units might be available, and the second hop channel knowledge can be used to save considerable amount of battery energy.

In present invention, the two-hop transmission facilitated by a node with energy harvesting capabilities. In present invention the node serving as a relay (2) possesses a battery (10) from which (possibly variable) amount of energy can be drawn as depicted in FIG. 2. Transmission takes place in three phases as depicted using time-switching relaying (TSR) protocol as shown in FIG. 3. In the first energy harvesting phase of αT duration, the source (1) transmits energy to the sensor serving as a relay (2), which harvests the energy $Q_r=P_s\|h_1\|^2\alpha\eta T$. Here '$P_s$' source power, 'α' denotes TSR parameter, 'η' denotes efficiency of energy harvesting unit, 'T' denotes the time duration, $\|\cdot\|$ denotes $l_2$ norm and '$h_1$' denotes channel between source (1) and relay (2). In the second slot of (1-α)T/2 duration, the source (1) transmits information symbols to the node serving as a relay (2). In the third time-slot also of duration (1-α)T/2, the node serving as a relay (2) communicates the symbols to the destination node (3) using the harvested energy $Q_r$ and $E_b$ energy from the battery (10). The relay (3) draws (possibly variable) amount of energy from the battery using the central controlling unit (11) and battery energy control unit (9) as shown in FIG. 4. In present invention We are interested in a) choosing fixed energy harvesting time (through α) to maximize throughput for fixed $E_b$, or b) choosing fixed α and minimum possible fixed $E_b$ to attain some desired throughput, and c) minimizing battery (10) energy consumption $E_b$ while allowing it to depend on channel values. The implementation of proposed invention is explained in two scenarios in two scenarios (i) two-hop network (ii) uplink transmission by nodes. The detailed explanation of each scenario as follows.

(I) Two-Hop Network:

Referring to FIG. 2 shows the system with multi antenna source (1) communicates with the destination node (3) with help of energy harvesting (EH) relay (2). The relay (2) has limited battery energy (10) which is to be used along the harvested energy to improve the system performance while prolonging battery lifetime. When using the standard TSR protocol of FIG. 3, the relay (2) harvests energy for fraction of time (αT). In the second phase of (1-α) T/2 duration, the relay (2) receives information from source and decodes it. In third phase of (1-α) T/2 time, the relay (2) forward the successfully decoded information to the destination (we assume a decode-and-forward (DF) relay (2), though similar optimizations can be performed for amplify-and-forward (AF) relays as well). For forwarding information, the relay (2) uses harvested energy along with variable amount of battery energy $E_b$ as shown in FIG. 4. The destination node (3) decodes the received information.

Referring to FIG. 5 shows the variation of system throughput with TSR parameter. It shows that there exists an optimum TSR parameter value which maximizes the throughput for different battery energy values. It also shows that using more battery energy improves the throughput. Optimum TSR parameter depends on system parameters, and a closed form expression for optimum TSR parameter can be found as follows. For information transmission rate 'R', outage $P_{out}$ characterizes performance using signal-to-noise ratio (SNR) at relay $\Gamma_r$ and SNR at destination $\Gamma_d$ as [2]:

$$P_{out} = Pr\{\rho_s X < \gamma_{th}\} + Pr\left\{\rho_s X > \gamma_{th}, \left(\frac{2\alpha\eta\rho_s X}{(1-\alpha)} + \frac{2E_b/\sigma^2}{(1-\alpha)T}\right)Y < \gamma_{th}\right\} \quad (1)$$

$$= 1 - \frac{\lambda_x^{N_x}}{\Gamma(N_s)}\int_{\frac{\gamma_{th}}{\rho_s}}^{\infty} x^{N_s-1} \exp\left(-\lambda_x x - \frac{(1-\alpha)\lambda_y \gamma_{th}}{2\alpha\eta\rho_s x + 2E_b/(T\sigma^2)}\right)dx.$$

In above expression '$\rho_s$' indicates SNR of source, 'α' denotes TSR parameter, 'η' denotes EH circuit efficiency, '$E_b$' denotes relay battery energy per time-slot, 'T' denotes time-slot, '$\sigma^2$' denotes noise variance and '$\gamma_{th}=2^R-1$' denotes threshold. In above expression, 'X' denotes channel between source-relay and 'Y' denotes channel between relay-destination. We use the high signal-to-noise (SNR) approximation of outage for finding α*. The high SNR approximation of outage for two-hop network with decode-and-forward relay can be written as [2]:

$$P_{out}; \frac{(1-\alpha)\lambda_x \lambda_y \gamma_{th}}{[2\alpha\eta\gamma_{th} + 2E_b/(T\sigma^2)]\lambda_x + (N_s-1)2\alpha\eta\rho_s} \quad (2)$$

Here $\lambda_x=(d_1)^3$ and $\lambda_y=(d_2)^3$. Here '$d_1$' denotes distance of source-relay, '$d_2$' denotes distance between relay and the destination, '$N_s$' is number of source terminal antennas and '$\rho_s$' denotes source SNR ($P_s/\sigma^2$).

(a) Throughput maximization for fixed $E_b$:

The throughput of the system is given by:

$$\tau=(1-\alpha)(1-P_{out})R/2 \quad (3)$$

The optimum TSR parameter can be found as:

$$\alpha^* = \underset{\alpha}{\operatorname{argmax}}\, \tau = \underset{\alpha}{\operatorname{argmax}}\, (1-\alpha)(1-P_{out})R/2 \quad (4)$$

It can be observed from FIG. 5 that '$\tau$' is concave with '$\alpha$'. Using (2) in (3) and $$\frac{\partial \tau}{\partial \alpha} = 0,$$

we can found '$\alpha^*$' of (4). We can found $\alpha^*$ as [2]:

$$\alpha^* = \frac{-b + \sqrt{b^2 - 4ac}}{2a}$$

With $$a = [2\lambda_x \eta \gamma_{th} + 2\eta\rho_s(N_s-1)]^2 + \lambda_x\lambda_y\gamma_{th}[2\lambda_x\eta\gamma_{th} + 2\eta\rho_s(N_s-1)],$$

$$b = (2\lambda_x\lambda_y\gamma_{th} + 2[2\lambda_x\eta\gamma_{th} + 2\eta\rho_s(N_s-1)])\left(\frac{2\lambda_x E_b}{T\sigma^2}\right) \text{ and}$$

$$c = \left(\frac{2\lambda_x E_b}{T\sigma^2}\right)^2 - 2\lambda_x\lambda_y\gamma_{th}\left(\frac{2\lambda_x E_b}{T\sigma^2}\right) - \lambda_x\lambda_y\gamma_{th}[2\lambda_x\eta\gamma_{th} + 2\eta\rho_s(N_s-1)].$$

FIG. 6 depicts the throughput with fixed TSR parameter and optimum TSR parameter $\alpha^*$. The throughput with optimum TSR parameter '$\alpha^*$' is higher than that with any other fixed TSR parameter for any given '$E_b$' which shows the importance of optimum TSR parameter. It shows that proposed hybrid usage of battery energy and harvesting energy is effective as compared to conventional techniques used in literature (i) only battery energy based technique which corresponds to '$\alpha=0$' (ii) only energy harvesting based technique which corresponds to $E_b=0$' [1]. It also shows that throughput with the expression for '$\alpha^*$' provided above matches closely with throughput with exact '$\alpha^*$' (it can be found numerically as in FIG. 5). It can be seen that the throughput increases as the relay battery energy '$E_b$' increases.

(b) Minimization of Battery Energy Consumption with Statistical Channel Knowledge:

FIG. 7 shows the battery energy required for desired throughput (or target throughput in quality-of-service based applications) performance with variation of TSR parameter. It is important to note that there is optimum TSR parameter value which minimizes the relay battery energy requirement. We can obtain the relation between the desired target throughput and required battery energy by equating the throughput in (3) to target throughput as follows [2]:

$$(1-\alpha)(1-P_{out})R/2 = \tau_{tr}. \quad (5)$$

$$(1-\alpha)\frac{R}{2}\frac{\lambda_x^{N_s}}{\Gamma(N_s)}\int_{\frac{\gamma_{th}}{\rho_s}}^{\infty} x^{N_s-1}\exp\left(-\lambda_x x - \frac{(1-\alpha)\lambda_y\gamma_{th}}{2\alpha\eta\rho_s x + 2E_b/(T\sigma^2)}\right)dx = \tau_{tr}.$$

The above expression can be obtained using '$P_{out}$' in (1). Here '$\tau_{tr}$' indicates target throughput. Using high signal-to-noise (SNR) outage expression of outage (2), we can write above expression as:

$$(1-\alpha)\frac{R}{2}\left(1 - \frac{(1-\alpha)\lambda_x\lambda_y\gamma_{th}}{[2\alpha\eta\gamma_{th} + 2E_b/(T\sigma^2)]\lambda_x + (N_s-1)2\alpha\eta\rho_s}\right) \cong \tau_{tr} \quad (6)$$

$$E_b = \frac{T\sigma^2}{2\lambda_x}\left(\frac{(1-\alpha)^2\lambda_x\lambda_y\gamma_{th}}{(1-2\tau_{tr}/R)-\alpha} - (N_s-1)2\alpha\eta\rho_s - 2\alpha\eta\lambda_x\gamma_{th}\right).$$

The above expression of battery energy for target throughput can be obtained trivially. We can obtain the optimum TSR parameter '$\alpha_b$' that minimizes relay battery energy consumption as:

$$\alpha_b = \underset{\alpha}{\operatorname{argmin}} E_b \quad (7)$$

We can found expression for '$\alpha_b$' using $$\frac{\partial E_b}{\partial \alpha} = 0 \text{ as:}$$

$$\alpha_b = \left(1 - \frac{2\tau_{tr}}{R}\right) - \frac{\sqrt{b_1^2 - 4a_1 c_1}}{2a_1}. \quad (8)$$

Here $a_1 = \lambda_x\lambda_y\gamma_{th} + [2\lambda_x\eta\gamma_{th} + 2\eta\rho_s(N_s-1)]$, $$b_1 = 2\left(1 - \frac{2\tau_{tr}}{R}\right) - [\lambda_x\lambda_y\gamma_{th} + 2\lambda_x\eta\gamma_{th} + 2\eta\rho_s(N_s-1)] \text{ and}$$

$$c_1 = \left(1 - \frac{2\tau_{tr}}{R}\right)^2[-2\eta\rho_s(N_s-1) - 2\lambda_x\eta\gamma_{th}] +$$

$$\lambda_x\lambda_y\gamma_{th} - 2\lambda_x\lambda_y\gamma_{th}\left(1 - \frac{2\tau_{tr}}{R}\right).$$

We note that the $\alpha_b$ gives the minimum energy consumption (which is depend only on statistical system parameters but not on channel state information (CSI) to achieve the target throughput, and denote it by $E_b^{nc}$. We note that $E_b^{nc}$ is the battery energy consumption without CSI at the relay.

(c) Exploiting Channel Knowledge to Minimize Battery Energy Consumption:

The energy consumption at the relay can be further minimized if the relay to destination CSI is available at relay. Using (1), we can write the battery energy required for successful transmission as:

$$E_b^{req} = \frac{T}{2}\left[\frac{\gamma_{th}\sigma^2(1-\alpha)}{Y} - 2\alpha\eta P_s X\right].$$

With the CSI available, we devise a mechanism to minimize the energy consumption at relay with target throughput requirement as [2]:

$$E_b = \begin{cases} \max(E_b^{req}, 0) & \text{if } E_b^{req} < E_b^{nc} \\ 0 & \text{if } E_b^{req} > E_b^{nc} \end{cases}$$

Here $E_b^{req}$ is CSI based relay energy required for successful decoding at the destination. The above condition ensures target throughput and minimizes relay energy consumption substantially due to CSI availability. In above scenario the relay does not transmit when $E_b^{req} > E_b^{nc}$, and transmits with required energy $\max(E_b^{req}, 0)$ when $E_b^{req} < E_b^{nc}$. We can observe energy consumption for different schemes with target throughput requirement in Table 1. It can be observed that the energy consumption is minimum with CSI availability and optimum TSR parameter $\alpha_b$. The average battery energy consumed $E_{b,avg}^{req}$ for target throughput $\tau_{tr}$, with CSI availability can be found as [2]:

$$E_{b,avg}^{req} = \int_{\frac{\gamma_{th}}{\rho_s}}^{\infty} \frac{\lambda_y \gamma_{th}(1-\alpha_b)T\sigma^2}{2\Gamma(n_s)}$$

$$\lambda_x^{N_s} x^{N_s} e^{-\lambda_x x} \left[ E_1\left(\frac{\lambda_y \gamma_{th}(1-\alpha_b)T\sigma^2}{2E_b^{nc} + 2\alpha_b \eta \rho_s T\sigma^2 x}\right) - E_1\left(\frac{\lambda_y \gamma_{th}(1-\alpha_b)}{2\alpha_b \eta \rho_s x}\right) \right] dx +$$

$$\int_{\frac{\gamma_{th}}{\rho_s}}^{\infty} \frac{\lambda_y \gamma_{th}(1-\alpha_b)T\sigma^2}{2\Gamma(n_s)}$$

$$\lambda_x^{N_s} x^{N_s} e^{-\lambda_x x} \left[ \exp\left(\frac{\lambda_y \gamma_{th}(1-\alpha_b)}{2\alpha_b \eta \rho_s x}\right) - \exp\left(\frac{\lambda_y \gamma_{th}(1-\alpha_b)T\sigma^2}{2E_b^{nc} + 2\alpha_b \eta \rho_s T\sigma^2 x}\right) \right] dx$$

Here $E_1$ (•) indicates exponential integral function.

We can analyze the two-hop system for power-splitting relaying (PSR) protocol with help of the FIG. 10 and FIG. 11. We note optimum PSR parameter for maximizing the throughput $\beta_\tau$, and optimum PSR parameter $\beta_b$ for minimizing energy consumption for target throughput.

TABLE 1

The energy consumption at relay for different conditions with target throughput requirement [2].

| Target throughput | Battery Energy required with fixed $\alpha$ $\alpha$ = 0.25 | Battery energy required with optimum TSR parameter $\alpha_b$ - without CSI | Battery energy required with optimum TSR parameter $\alpha_b$ - with CSI |
|---|---|---|---|
| 1.2 | 407 | 339 | 28 |
| 1.5 | 674 | 636 | 81 |
| 2 | 1451 | 1367 | 295 |

(II) Uplink Transmission by Sensors:

Referring to FIG. 8 shows the sensors (users) communicate with base station (source) with the help of harvested energy and battery energy. The selected sensor (for communication with source) harvest energy for fraction of time $\alpha T$ as shown in FIG. 9. The sensor uses harvested energy $Q_u = P_s |h_u|^2 \alpha \eta T$ along with the battery energy $E_b$ for transmission. Here '$h_u$' denotes the channel between source and sensor. The sensor sends its information to source using available power:

$$P_u = \frac{Q_u}{(1-\alpha)T} + \frac{E_b}{(1-\alpha)T} = \frac{P_s |h_u|^2 \alpha \eta}{(1-\alpha)} + \frac{E_b}{(1-\alpha)T}.$$

The received signal-to-noise ratio at source can be written as:

$$\Gamma_s = \frac{P_u |h_u|^2}{\sigma^2} = \frac{P_s |h_u|^4 \alpha \eta}{(1-\alpha)\sigma^2} + \frac{E_b |h_u|^2}{(1-\alpha)\sigma^2 T}.$$

For information transmission rate 'R' and outage $P_{out}$, the throughput of the uplink system can be defined as:

$$\tau = (1-\alpha)(1-P_{out})R$$

The high SNR approximation of outage in above expression can be written as:

$$P_{out} \square \frac{\left(-\frac{\lambda_s E_b}{2\alpha \eta P_s \sigma^2 T} + \lambda_x \sqrt{\left(\frac{E_b}{2\alpha \eta P_s \sigma^2 T}\right)^2 + \frac{y_{th}(1-\alpha)}{\alpha \eta P_s}}\right)^{N_s}}{N_s!}. \quad (9)$$

Here $\Delta_x = d^3$. Here '$\eta$' denotes EH circuit efficiency, '$E_b$' denotes relay battery energy, '$\sigma^2$' is noise variance, '$N_s$' is number of source terminal antennas, '$\sigma^2$' is noise variance and 'd' denotes the distance between source and sensor. The optimum TSR parameter can be found as:

$$\alpha^* = \underset{\alpha}{\operatorname{argmax}} \tau = \underset{\alpha}{\operatorname{argmax}} (1-\alpha)(1-P_{out})R.$$

We further investigate the minimization of required battery energy for desired target throughput by equating system throughput to target throughput '$\tau_{tr}$' as:

$$(1-\alpha)(1-P_{out})R = \tau_{tr}$$

We can use $P_{out}$ in (9) and obtain expression for $E_b$. We can minimize the required energy for target throughput $\tau_{tr}$ requirement by optimizing TSR parameter as:

$$\alpha_b = \underset{\alpha}{\operatorname{argmax}} E_b$$

Using the above expression we can obtain the optimum TSR parameter for minimizing the required battery energy $E_b$ for target throughput in similar fashion discussed in two-hop network.

While aspects of the present invention have been particularly shown and described, it will be understood by those skilled in the art that various additional embodiments may be contemplated by modification of the disclosed device without departing from the scope of what is disclosed. Such embodiments should be understood to fall within the scope of the present invention as determined based upon claims and any equivalents thereof.

We claim:

1. A wireless system for improving performance and prolonging battery lifetime of a node by energy harvesting, the wireless system comprising:
    at least a source node configured to provide RF signals;
    at least a destination node configured to receive the RF signals transmitted from the source node;
    a relay in communication with the source node and the destination node, where the source node is configured for communicating with the destination node via the relay for a Time "T", where the Time "T" has a first signaling phase, a second signaling phase, and a third signaling phase, the relay comprising:
        an energy harvesting unit comprising an energy storage element, configured for harvesting an energy from the source node in the first signaling phase and storing the energy in the energy storage element;
        an information processing unit configured for decoding the RF signal received from the source node in the second signaling phase and transferring the decoded RF signal to the destination node;

a battery energy control unit having a battery, configured for controlling an amount of energy to be withdrawn from the battery;

a central controlling unit in communication with the energy harvesting unit, the battery energy control unit, and the information processing unit, configured for optimizing a fraction of Time "T" apportioned to the first signaling phase for optimizing harvested energy stored via the energy harvesting unit and for transferring the decoded RF signal from the information processing unit to the destination node in the third signaling phase with (i) the harvested energy from the energy harvesting unit augmented with (ii) energy withdrawn from the battery via the battery energy control unit.

2. The system of claim 1, wherein the battery energy control unit extracts the energy from the battery as specified by the central controlling unit.

3. The system of claim 1, wherein the relay uses a Time switching relay (TSR) protocol.

4. The system of claim 1, wherein the relay comprises a switching circuit for switching the relay from the energy harvesting unit to the information processing unit, after harvesting the energy from the source.

5. The system of claim 1, wherein the energy harvesting unit comprises a matching circuit and 3 stage voltage multiplier.

6. The system of claim 1, wherein the energy storage element comprises a super capacitor.

7. The system of claim 1, wherein the central controlling unit optimizes the fraction of Time "T" so that the harvested energy is optimally stored within the Energy storage element.

8. A method for improving performance and prolonging battery lifetime of a node by energy harvesting in wireless system, the method comprising:

providing an RF signal by a source node;

receiving the RF signal from the source node by a destination node;

configuring a relay in such a way so that the relay communicates with the source node and the destination node, and configuring the source node in such a way such that the source node communicates with the destination node via the relay for a Time "T", the Time "T" having a first signaling phase, a second signaling phase and a third signaling phase, and the relay comprising: an energy harvesting unit, an information processing unit, a battery control unit, and a central controlling unit;

via the energy harvesting unit, harvesting energy from the source node RF signal and storing the harvested energy in a storage element in the first signaling phase by an energy harvesting unit;

via the information processing unit, decoding the RF signal from the source node by an information processing unit in the second signaling phase;

via the battery control unit, controlling an amount of energy to be extracted from a battery by a battery control unit; and via the central controlling unit, optimizing a fraction of the time "T" apportioned to the first signaling phase for optimizing harvested energy by the central controlling unit, the central controlling unit in communication with the energy harvesting unit, the information processing unit, and the battery control unit for transferring the decoded RF signal from the information processing unit to the destination node by augmenting (i) the harvested energy from the energy harvesting unit with (ii) the battery energy from the battery control unit in the third signaling phase.

\* \* \* \* \*